Figures 1, 2:
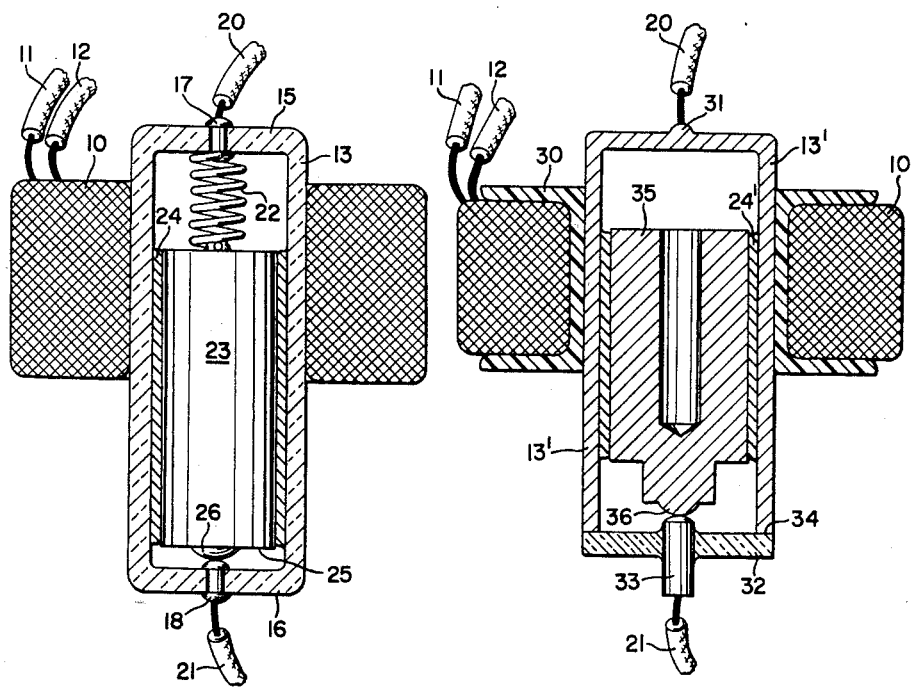

Nov. 15, 1960  J. W. MOBARRY  2,960,584
THERMAL OVERLOAD DEVICE
Filed June 12, 1958

INVENTOR.
JOHN W. MOBARRY
BY Joseph E. Ryan
ATTORNEY

United States Patent Office 2,960,584
Patented Nov. 15, 1960

2,960,584

THERMAL OVERLOAD DEVICE

John W. Mobarry, Edina, Minn., assignor to Minneapolis-Honeywell Regulator Company, Minneapolis, Minn., a corporation of Delaware Filed June 12, 1958, Ser. No. 741,590

1 Claim. (Cl. 200—88)

The presently disclosed device is a form of thermal overload control unit and more specifically is an electromagnetically operated unit which depends on the melting of a material to release the electromagnetic operator.

In the control of electromagnetic and electrical devices the temperature rise or internal heat of the unit is an important controlling factor. Many electrical devices can be operated only to a fixed temperature limit due to the possibility of mechanical failure of insulating materials. In many cases this may be referred to as the control temperature of the device and exceeding this temperature for any period of time will normally cause serious damage and possible destruction of the unit. In certain applications of electrical rotating devices such as motors, a sudden overload can occur due to changes in the system being operated. This is particularly true in hermetically sealed air conditioning units or refrigerating units where the refrigerant is used to cool the motor, as well as an external load. If for some reason the refrigerant is lost, the motor temperature can rise suddenly without an appreciable change in armature current. In order to protect such a device it is necessary to have a fast operating thermal control or overload imbedded directly in the motor. This type of device further requires that external reset arrangements be provided so that it is not necessary to open the motor if a sudden overload occurs.

The novel device of the present application is a thermal overload protector that can be buried directly in the stator of such devices as electric motors. In certain cases the current passing through the motor can be caused to flow around the presently disclosed device to generate a magnetic field. In the present specification the term "coil" will be broadly used to include a conventional type of winding, as well as a single turn or two of a heavy conductor carrying a large current, such as the motor current. If a sufficiently large number of ampere-turns is supplied to a solenoid type device, a plunger can be conveniently actuated within the center of the conductors carrying the current. Further, if the plunger is restrained in a fixed position by a material having a melting point or melting temperature which corresponds to the safe control temperature of the device, it can be readily appreciated that a control function can be developed between the magnetic field and the sudden release of the solenoid plunger upon melting of the retaining material. When an electric circuit is completed through the magnetic plunger and its enclosure, an electric circuit can be interrupted at any time the plunger is operated due to the melting of the material which holds the plunger rigidly in place. The principle of operation of the presently disclosed device is thus quite simple and can be applied to many physical forms. In the construction of a practical unit, the material having a low melting point utilized to hold a plunger in the fixed position at temperatures below the control temperature would usually be some form of solder. Many types of metals having different melting points can be utilized and the selection of the correct material is a matter well known to those versed in the art.

In the present application a primary object is to provide a novel motor overload device that can be remotely reset while still being intimately located in the area of control.

It is still a further object of the present application to disclose a very simple and cheap device that can be installed and operated as a motor overload device.

Yet another object of the present invention is to disclose a motor control device that is positive in its action.

Still a further object of the present disclosure is to show how a part of an existing electrical or electromagnetic device can be utilized in forming a thermal overload control unit.

These and other objects will become apparent when the drawing associated with the present specification is fully considered, wherein:

Figure 1 is a preferred embodiment of the solenoid operated thermal overload control device and which has a spring means for positve action, and Figure 2 is a second embodiment of a similar type device wherein the reset function of the thermal overload is accomplished by capillary attraction or by gravity.

In Figure 1 there is disclosed a coil 10 having two energizing leads 11 and 12. It is understood that the coil 10 could be a single turn of large wire carrying a substantial amount of current or a conventional coil as shown. The coil 10 encircles a solenoid enclosure 13 which is formed of an insulating material such as glass. Passing through the ends 15 and 16 of the enclosure 13 are two contact members or terminals 17 and 18. Attached to these terminals are leads 20 and 21. The terminal 17 is then electrically connected to a compression spring 22 which rides against a magnetic plunger 23. The magnetic plunger 23 is retained in a fixed position by a film of material 24 which passes around the entire circumference of the plunger 23. It will be appreciated that the circular plunger 23 is thus held rigidly in the enclosure 13 and could be readily acted upon by any flux generated by the coil 10. At the bottom 25 of the plunger 23 there is a second contact 26 which engages the contact 18. It is obvious that a complete electrical circuit is therefore provided between the conductor 20, terminal 17, spring 22, plunger 23, terminal 26, terminal 18 and the conductor 21. The circuit just described is the control circuit which when broken, can disconnect an associated electrical device. More specifically, the device controlled would normally be the one passing the current through conductors 11 and 12. The film of material 24 in the preferred embodiment would be some form of solder that had a melting point or temperature which would correspond to the control temperature or safe temperature to which the controlled device can be subjected.

In operation, a current passes through conductors 11 and 12 and the coil 10, generating a magnetic field which passes through the magnetic plunger 23. At any time that the temperature to which the enclosure 13 is subjected rises above the melting point of the film of material 24, the film melts. Upon the film 24 melting the magnetic field causes the magnetic plunger 23 to be pulled upwards, tending to center the magnetic plunger 23 in the coil 10. It is obvious that as soon as the contact 26 separates from contact 18 the electrical circuit between the conductors 20 and 21 is disrupted. By this arrangement a control circuit is provided which is sensitive to the temperature at which the film 24 melts.

As soon as the plunger 23 moves, a control function is accomplished and the coil 10 is immediately de-energized. This can be readily accomplished by any convenient external control circuit and thereby relieves the enclosure 13 of the magnetic field that previously existed. As soon as the magnetic field is removed the compression spring 22 forces the plunger 23 back to the position shown. As soon as the unit cools sufficiently for the film of material 24 to solidify the control device is ready for operation once again.

In Figure 2 there is disclosed a modification of the device in Figure 1 and similar numbering will be utilized in both devices so that a correspondence of function will become apparent. Coil 10 is provided with leads 11 and 12. The coil 10 is further shown as being wound on an insulating bobbin 30 which passes around an enclosure 13', which in this case is made of a conductive metal. Attached to the top of the enclosure 13' is a conductor 20. The attachment occurs at 31 and can be a welded or soldered joint providing the joint has a sufficiently high temperature characteristic so as not to melt at the temperature of operation of the unit. Closing the bottom of the enclosure 13' is an insulating disc 32 which has a contact 33 passing therethrough. The insulating disc 32 is attached at 34 to the enclosure 13' by any convenient process. Attached to the contact 33 is the conductor 21 as corresponds to the disclosure in Figure 1.

Contained in enclosure 13' is a magnetic plunger 35. The magnetic plunger 35 has an integral contact end 36 which touches the contact 33. A conductive film of material 24' encircles the plunger 35 and causes it to adhere rigidly to the enclosure 13'. Once again the plunger 35 is cylindrical in shape and the film of conductive material 24' passes around the entire surface. The conductive material 24' has a melting characteristic similar to that of 24. Since the film 24' is conductive in nature it will be appreciated that an electric circuit is completed between conductor 20, enclosure 13', the film 24', plunger 35, contact end 36, contact 33 and conductor 21. The electric circuit between the conductor 30 and 21 follows a somewhat similar pattern to that disclosed in Figure 1 with the exception that the enclosure 13' replaces the conductive path of the compression spring 22.

The operation of the device disclosed in Figure 2 is quite similar to that in Figure 1. Upon a sufficient rise in temperature of the area around the device disclosed in Figure 2, the conductive film 24' melts. As soon as the film melts the magnetic field created by the coil 10 causes the plunger 35 to rise and thereby disconnect the circuit between contact end 36 and the contact 33. As soon as the coil 10 is de-energized, so as to remove the magnetic field, the plunger 35 returns to the position shown in Figure 2 either by gravity or by capillary attraction. If the distance between the plunger 35 and the enclosure 13' is sufficiently small, the melted conductive material 24' will act as a capillary material and will attract the plunger back to the position as shown. The most satisfactory operation of this particular arrangement is when the capillary attraction and gravity are co-acting. With the arrangement disclosed in Figure 2 a device is disclosed which has less parts and is more economical to manufacture.

It is apparent from the disclosure of Figures 1 and 2 that the invention lies in the use of a solenoid type device with a holding film that melts at a control temperature. While Figure 1 and Figure 2 have been disclosed as the preferred embodiments, it is clear that many modifications could be made which would utilize the novel idea of the present application. With this in mind the applicant wishes to be limited in scope only by the appended claim.

I claim as my invention:

A thermal electrical overload device in a heat exchange relationship with a controlled electrical device: enclosure means thermally in contact with said controlled device and including magnetic field generating means; magnetic plunger means of electrical conductive material having an electrical contact held in said enclosure means by a metal having a melting point at a control temperature; and electrical means including said plunger and a contact completing an electric circuit through said plunger means and said enclosure means at any temperature below said control temperature; said magnetic plunger means being released by said metal melting whenever said controlled device is subjected to a temperature above said control temperature; said plunger means released to move in said enclosure means under the influence of said magnetic field generating means to separate said electric contacts and break said electric circuit.

References Cited in the file of this patent
UNITED STATES PATENTS

| | | |
|---|---|---|
| 1,513,269 | Perkins | Oct. 28, 1924 |
| 1,636,953 | Dreyer | July 26, 1927 |
| 2,455,011 | Ingels | Nov. 30, 1948 |
| 2,781,769 | Reiter | Feb. 19, 1957 |
| 2,875,298 | Tracy | Feb. 24, 1959 |
| 2,917,606 | Durland | Dec. 15, 1959 |

FOREIGN PATENTS

| | | |
|---|---|---|
| 651,460 | Germany | Oct. 14, 1947 |